(12) United States Patent
Kaltenbach et al.

(10) Patent No.: US 8,727,925 B2
(45) Date of Patent: May 20, 2014

(54) METHOD FOR OPERATING A DRIVE TRAIN OF A HYBRID VEHICLE

(71) Applicant: ZF Friedrichshafen AG, Friedrichshafen (DE)

(72) Inventors: Johannes Kaltenbach, Friedrichshafen (DE); Kai Borntrager, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/654,861

(22) Filed: Oct. 18, 2012

(65) Prior Publication Data

US 2013/0102429 A1 Apr. 25, 2013

(30) Foreign Application Priority Data

Oct. 21, 2011 (DE) .......................... 10 2011 084 930

(51) Int. Cl.
| | |
|---|---|
| *F16H 3/72* | (2006.01) |
| *F16H 37/06* | (2006.01) |
| *B60W 10/02* | (2006.01) |
| *B60W 10/04* | (2006.01) |
| *H02P 15/00* | (2006.01) |

(52) U.S. Cl.
USPC .................. 475/5; 180/65.235; 477/5; 477/6; 477/8

(58) Field of Classification Search
USPC ................. 475/1–10; 180/65.235; 477/5, 6, 8
See application file for complete search history.

(56) References Cited

U.S. PATENT DOCUMENTS

| | | | | |
|---|---|---|---|---|
| 5,856,709 | A * | 1/1999 | Ibaraki et al. .................... | 290/45 |
| 7,942,776 | B2 | 5/2011 | Conlon | |
| 8,550,947 | B2 * | 10/2013 | Kasuya et al. ..................... | 475/5 |
| 2010/0125020 | A1 * | 5/2010 | Ikegami et al. ................... | 477/3 |
| 2013/0012353 | A1 * | 1/2013 | Yoshida et al. ................... | 477/5 |

FOREIGN PATENT DOCUMENTS

| | | |
|---|---|---|
| DE | 69619058 T2 | 9/2002 |
| DE | 102 25 249 A1 | 12/2003 |
| DE | 10 2006 054 405 A1 | 6/2008 |
| DE | 102008064087 A1 | 12/2009 |

OTHER PUBLICATIONS

German Search Report issued in corresponding German Application No. 10 2011 084 930.0 mailed Jan. 8, 2014.

* cited by examiner

*Primary Examiner* — Tisha Lewis
(74) *Attorney, Agent, or Firm* — Davis & Bujold, PLLC; Michael J. Bujold

(57) ABSTRACT

A method for operating a hybrid vehicle drive-train having an engine, electric machine, transmission and a planetary gear-set comprising ring, sun and carrier elements. A first planetary element is coupled to a transmission input shaft, a second planetary element is coupled to the electric machine, and a first clutch couples a third planetary element to the engine while a second clutch couples two of the three elements. When the second clutch is disengaged, the drive-train operates in a first mode while, when the second clutch is engaged, the drive-train operates in a second mode. When starting up or crawling, to change from first to second mode while maintaining traction force at the output, the second clutch engages to reduce the transmission capacity of the first clutch until slip occurs, then the engine speed is regulated, while synchronizing the second clutch, after which the second clutch engages without any load.

9 Claims, 3 Drawing Sheets

METHOD FOR OPERATING A DRIVE TRAIN OF A HYBRID VEHICLE

This application claims priority from German patent application serial no. 10 2011 084 930.0 filed Oct. 21, 2011.

FIELD OF THE INVENTION

The invention concerns a method for operating a drive-train of a hybrid vehicle.

BACKGROUND OF THE INVENTION

From DE 10 2006 054 405 A1 a drive-train of a hybrid vehicle is known, whose drive aggregate comprises an internal combustion engine and an electric machine. The internal combustion engine of the drive aggregate and the electric machine of the drive aggregate are connected, with interposition of a planetary gear system, to a transmission of the drive-train, the planetary gear system comprising the elements of a ring gear, a sun gear and a carrier. A first element of the elements of the planetary gear system is coupled to an input shaft of the transmission. A second element of the elements of the planetary gear system is coupled to the electric machine of the drive aggregate. A third element of the elements of the planetary gear system is coupled to the internal combustion engine, namely via a first clutch which, according to DE 10 2006 054 045 A1, is in the form of a friction clutch. Furthermore, from this prior art it is known to couple two elements of the planetary gear system to one another via a second clutch, this second clutch being a friction clutch according to DE 10 2006 054 405 A1. The second clutch, by means of which two of the three elements of the planetary gear system can be coupled, is also referred to as a bridging clutch and when the second clutch is open the drive-train operates in a first operating mode, whereas when the second clutch is closed the drive-train operates in a second operating mode. The first operating mode is called the EDD operating mode or Electro-Dynamic-Drive mode of the electro-dynamic drive system, while in contrast the second operating mode is also called the ISG operating mode or Integrated-Starter-Generator operating mode.

From DE 102 25 249 A1 a method for operating such a drive-train during the starting process is known, such that according to this prior art, in a starting process with the help of the clutch by means of which the two elements of the planetary gear system can be coupled, the clutch is operated with slip so as to support the torque, namely when the electric machine of the hybrid drive cannot deliver a sufficiently high torque during starting. According to this prior art, frictional work is performed at the bridging clutch, which must necessarily be made as a friction clutch, and this results in wear of the bridging clutch, which is disadvantageous.

SUMMARY OF THE INVENTION

Starting from there, the purpose of the present invention is to provide a new type of method for operating a drive-train during starting or crawling, for changing between the two operating modes, which when the clutch that couples two of the three elements of the planetary gear system is in the form of a friction clutch, results in no wear thereof, and which can also be used when the clutch is in the form of an interlocking clutch.

This objective is achieved according to a first aspect of the invention. According to this, when the drive-train is started up or crawling, to change from the first to the second operating mode, while maintaining a traction force at a drive output of the drive-train, the second clutch is closed in such a manner that the transmission capacity of the first clutch is first reduced until it is operating in a slipping mode, then the internal combustion engine is operated at a controlled running speed in order to synchronize the second clutch, and finally the second clutch is closed while under no load.

By virtue of this first aspect of the invention, during starting and crawling the operating mode of the drive-train can be changed from the EDD to the ISG mode while maintaining the traction force at the drive output of the drive-train, namely both when the clutch, which couples the two elements of the planetary gear system, is made as a friction clutch, and also when that clutch is an interlocking clutch. In the case when the clutch is in the form of a friction clutch, it is not at risk of increased wear since the clutch can be operated without friction power.

According to an advantageous further development of the first aspect of the invention, during the speed-controlled operation of the internal combustion engine, the rotational speed of the electric machine and that of the third element of the planetary gear system's elements are synchronized.

By regulating the rotational speed of the internal combustion engine, it can be ensured particularly simply and advantageously that the second clutch can be operated under no load.

According to a second aspect of the invention, when the drive-train is started up or crawling, to change from the second to the first operating mode, while maintaining a traction force at a drive output of the drive-train, the second clutch is opened in such manner that by adapting a torque delivered by the electric machine, the second clutch is first relieved of any load, and the second clutch is then opened under no load.

During starting and crawling, the second aspect of the present invention enables changing from the ISG to the EDD operating mode of the drive-train, again while maintaining the traction force, and this both with a frictional and with an interlocking second clutch. In this case too the second clutch can be operated under no load.

In an advantageous further development of the second aspect of the invention, after the no-load opening of the second clutch, the torque delivered by the electric machine and/or by the internal combustion engine, and/or the transmission capacity of the first clutch, is/are adapted in such a manner that a speed difference and hence the slip at the first clutch are reduced. This further development enables the first clutch to be actuated with low wear.

BRIEF DESCRIPTION OF THE DRAWINGS

Preferred further developments of the invention emerge from the description given below. Example embodiments of the invention, to which it is not limited, are explained in greater detail with reference to the drawings, which show.

DETAILED DESCRIPTION OF THE PREFERRED EMBODIMENTS

The present invention concerns a method for actuating a drive-train of a hybrid vehicle.

Figure 1:
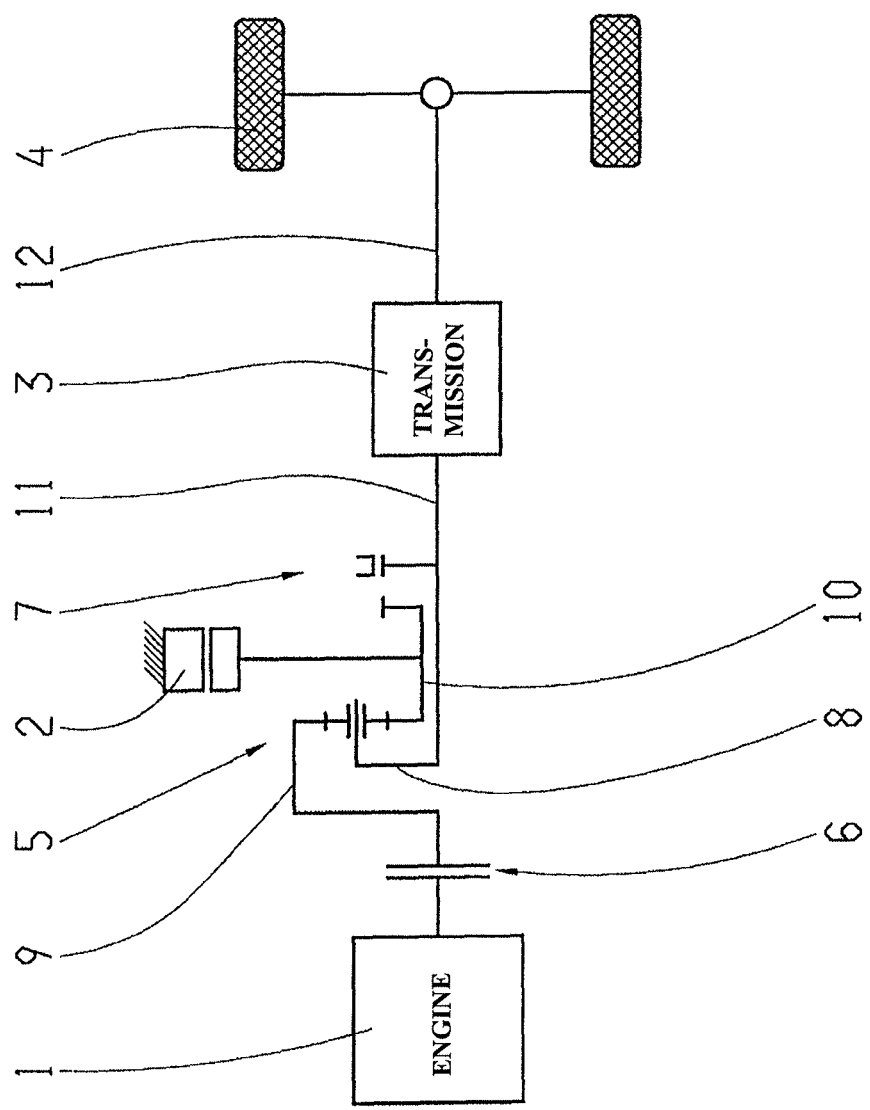
FIG. 1: A schematic representation of a drive-train.

FIG. 1 is a very schematic representation of a drive-train layout of a hybrid vehicle, in which the method according to the invention can be used to good advantage. The drive-train represented in FIG. 1 comprises a drive aggregate with an internal combustion engine 1 and an electric machine 2. Between the drive aggregate, which comprises the internal combustion engine 1 and the electric machine 2, and a drive output 4 of the drive aggregate, is connected a transmission 3. The internal combustion engine 1, the electric machine 2 and the transmission 3 are coupled to one another with the interposition of a planetary gear system 5, the planetary gear system comprising three elements, namely a carrier 8, a ring gear 9 and a sun gear 10. A first element of the planetary gear system 5 in the example embodiment shown, namely the carrier 8, is coupled to a transmission input shaft 11 of the transmission 3. A second element of the planetary gear system 5 in the example embodiment shown, namely the sun gear 10, is coupled to the electric machine 2. A third element of the planetary gear system 5 in the example embodiment shown, namely the ring gear 9, is coupled to the internal combustion engine 1 with interposition of a first clutch 6 which, in the example embodiment shown, is in the form of a friction clutch. Two elements of the planetary gear system, namely in the example embodiment shown, the carrier 8 and the sun gear 10, can be coupled by means of a second clutch 7, this second clutch 7 also being called the bridging clutch and in the example embodiment shown being in the form of an interlocking clutch, namely a claw clutch.

It should be pointed out that the association of the three elements of the planetary gear system, namely the carrier 8, the ring gear 9 and the sun gear 10, respectively with the transmission 3, the electric machine 2 and the internal combustion engine 1, can also be different. Instead of the minus planetary gear system shown in FIG. 1, a plus planetary gear system can also be used. The interlocking bridging clutch 7 can also be a friction clutch.

The drive-train shown in FIG. 1 can be operated in different operating modes. In a first operating mode, also known as the EDD or electro-dynamic-drive operating mode of the drive-train, the second clutch 7 is open and the first clutch 6 is preferably closed. In a second operating mode of the drive-train also known as the ISG or integrated-starter-generator operating mode, the second clutch 7 is closed and the first clutch 6 is preferably open.

The present invention now concerns a method for operating such a drive-train, with which, when the drive-train is being started or is crawling, i.e. at low driving speeds, a change between the operating modes is possible while maintaining the traction force at the drive output 4, namely both a change from the first operating mode to the second, i.e. from the EDD to the ISG operating mode, and also conversely, a change from the second to the first operating mode, i.e. from the ISG to the EDD operating mode.

When starting off or crawling, i.e. when the drive-train is being operated at a low driving speed, a switch from the first to the second operating mode, i.e. from the EDD to the ISG operating mode, may be required if, in the EDD mode, the electric machine 2 can only supply little torque and can therefore provide relatively low torque at the drive output 4. This situation can occur, for example, if for reasons of cost or available space, the electric machine 2 is not designed to deliver the full traction force. The switch from the first to the second operating mode, i.e. from EDD to ISG operation, can also be necessary if an electrical energy accumulator co-operating with the electric machine 2 is too rapidly charged or too rapidly discharged.

In the example cases mentioned above, it may be necessary while starting or crawling in the first operating mode, i.e. in the EDD mode, to change to the second operating mode, i.e. to the ISG mode while maintaining the traction force at the drive output 4.

To change from the first, or EDD operating mode to the second, or ISG operating mode, the previously open, second clutch 7 is closed, namely in such manner that first, the transmission capacity of the first clutch 6 is reduced until it is operating with slip, then the internal combustion engine 1 is operated with its running speed being regulated while the second clutch 7 is synchronized, and thereafter the second clutch 7 is closed under no load regardless of whether it is in the form of a friction or interlocking clutch.

Figure 2:
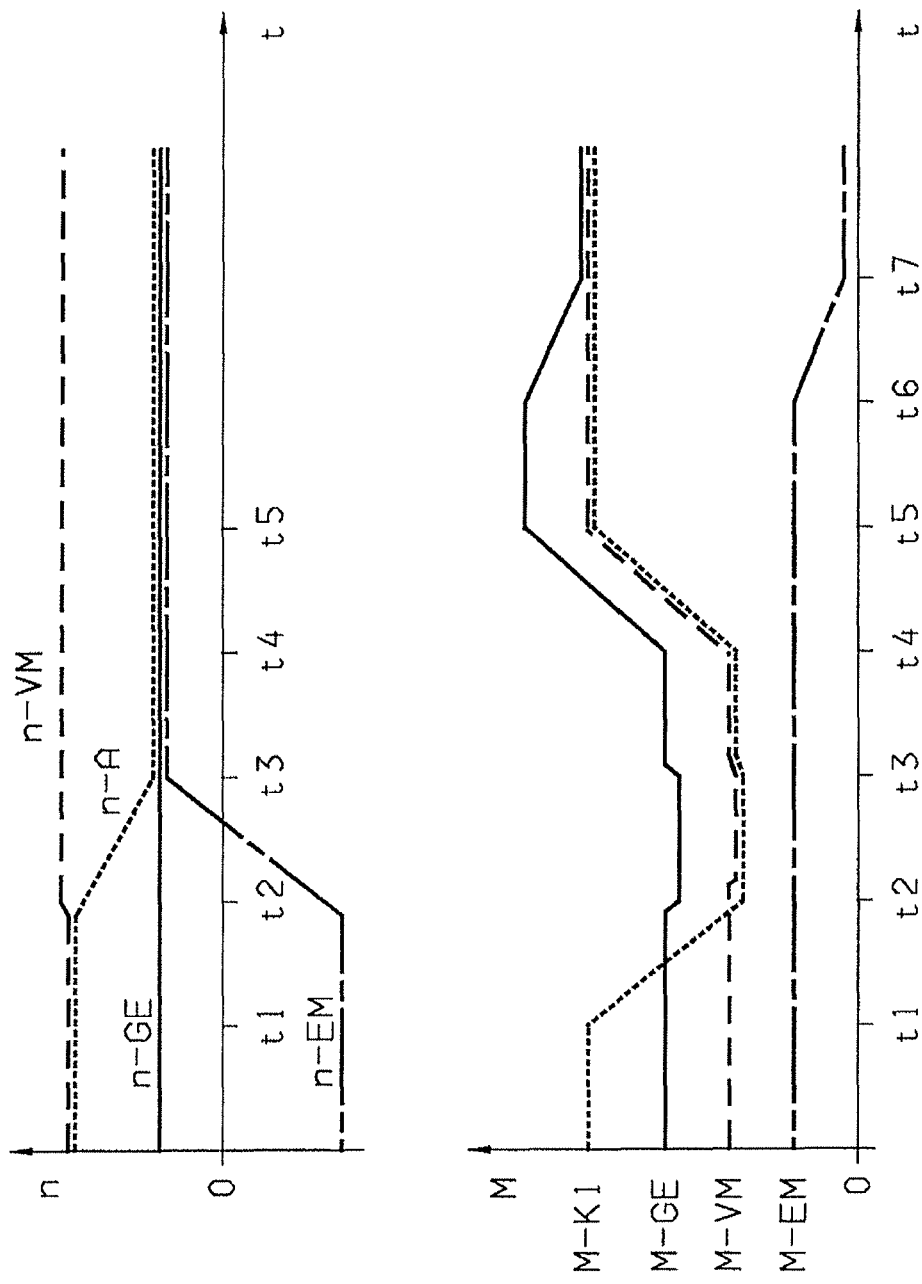
FIG. 2: A first diagram to make clear the method according to the invention for operating a drive-train.

Below, further details of the change from the first, or EDD operating mode to the second, or ISG operating mode during starting or crawling, while maintaining the traction force at the drive output 4, are described with reference to FIG. 2 in which several variations of running speeds n and torques M are plotted against time t. Thus, FIG. 2 shows the time variations of a running speed n-VM of the internal combustion engine 1, a rotational speed n-EM of the electric machine 2, a rotational speed n-GE of the transmission input shaft 11 and a rotational speed n-A of an element of the planetary gear system 5 that can be coupled by the first clutch 6 to the internal combustion engine 1, in this example embodiment the ring gear 9. As torque variations FIG. 2 shows the torque M-VM delivered by the internal combustion engine 1, the torque M-EM delivered by the electric machine 2, the torque M-GE of the transmission input shaft 11 and the torque M-K1 that can be transmitted by the first clutch 6.

In the specific example embodiment of FIG. 2, before time t1 the drive-train is operating during starting or crawling in the first operating mode, i.e. the EDD mode, and for this the first clutch 6 is fully closed and the second clutch 7 is fully open. In the example embodiment of FIG. 2, the speed n-VM of the internal combustion engine 1 is constant, assuming that the speed n-VM cannot be reduced any more or that it is close to the idling speed. Furthermore, in the example embodiment of FIG. 2, it is assumed that the speed of the drive-train during starting or crawling is constant, from which it follows that the speed n-GE of the transmission input shaft 11 is also constant.

It can also be seen from FIG. 2 that the electric machine 2 rotates with an opposite sign to the internal combustion engine 1, since the speed n-EM is negative before time t1 so that, accordingly, in the initial condition of the drive-train of FIG. 2 the electric machine 2 is working as a generator. The torque supplied to the transmission input 11 corresponds to the sum of the torque M-VM delivered by the internal combustion engine 1 and the torque M-EM delivered by the electric machine 2. The torque M-K1 that can be transmitted by the clutch 6 is greater than the torque M-VM delivered by the internal combustion engine 1, so that the clutch 6 is securely engaged and fully closed.

Now, starting from this first, or EDD operating mode, to change to the second, or ISG operating mode, beginning from time t1, the transmission capacity of the first clutch 6 is reduced; in FIG. 2 this reduction of the torque M-K1 that can be transmitted by the clutch 6 takes place linearly until, at time t2, slipping or a defined rotational speed difference is detected at the first clutch 6.

Starting at t2, a speed-regulated operation of the internal combustion engine 1 takes place such that a slight reduction of the torque M-VM of the internal combustion engine 1 prevents the speed n-VM of the internal combustion engine 1 from increasing. Since the first clutch 6 is delivering less torque to the planetary gear system 5, namely to the ring gear 9 in the example embodiment shown, whereas the electric machine 2 is delivering the same torque M-EM, the speeds n-EM and n-A, i.e. the speeds of the electric machine 2 and the ring gear 9, change in the direction of synchronization. Owing to the speed reduction at the third element of the planetary gear system 5, i.e. in the example embodiment shown the reduction of the speed n-A of the ring gear 9, the slip at the first clutch 6 increases and thus also its power loss.

Between times t2 and t3, the electric machine 2 changes from generator operation to motor operation, specifically when the sign of the speed n-EM of the electric machine 2 changes from negative to positive.

At time t3, the second clutch 7 has been synchronized, and according to FIG. 2 at that time t3 the transmission capacity of the first clutch 6, i.e. the torque M-K1, is slightly increased and, indirectly thereby, also the torque M-VM delivered by the internal combustion engine 1.

Starting at time t3, i.e. after the second clutch 7 has been synchronized, the second clutch 7 is closed under no load, this closing process of the second clutch 7 lasting until time t4.

After the no-load closing of the second clutch 7, i.e. after the time t4, in the example embodiment of FIG. 2 the torque M-K1 that can be transmitted by the first clutch 6 is increased again and hence indirectly also the torque m-VM delivered by the internal combustion engine 1, and this is done until, at time t5, a desired torque M-GE has been reached at the transmission input shaft 11. In the example embodiment shown, the torque M-EM delivered by the electric machine 2 operating as a motor at time t4 is at first constant, but it can also be reduced since, when the second clutch 7 is closed, the planetary gear system 5 is bridged.

At time t5, in the ISG operating mode, starting, maneuvering or crawling is possible by means of the first clutch 6, with the electric machine 2 operating as a motor and therefore able to deliver torque to the drive output 4. In the example embodiment of FIG. 2 shown, the torque M-EM delivered by the electric machine is reduced between times t6 and t7, whereby the torque M-GE at the transmission input shaft 11 then also decreases.

As a difference from the example embodiment of FIG. 2, it is also possible from time t1, i.e. after the full, no-load closing of the second clutch 7, to reduce the torque M-K1 that can be transmitted by the first clutch 6 and the torque M-VM delivered by the internal combustion engine 1 all the way to zero and open the first clutch 6 fully, which then enables purely electric driving, namely purely electric starting or crawling.

This alternative is preferred when the electric machine 2 can deliver, by itself, the torque required for starting or crawling and when sufficient energy is available in the electrical energy accumulator that co-operates with the electric machine 2.

The converse change, from the second operating mode, i.e. the ISG mode, to the first operating mode, i.e. the EDD mode, during starting or crawling, may for example be necessary if, during starting by means of the first clutch 6, the first clutch 6 is too severely stressed or when the driving torque needed becomes less so that an EDD operating mode less prone to wear is also preferred.

When the drive-train is starting or crawling, in order to change from the second, or ISG operating mode to the first, or EDD operating mode, while maintaining the traction force at the drive output 4, the second clutch 7 is opened under no load, namely in such manner that by adapting the torque delivered by the electric machine 2, the second clutch 7 is first made load-free, and then it is opened under no load.

Below, details of this are described with reference to FIG. 3 in which speed and torque variations are again plotted as a function of time, namely the speed n-VM of the internal combustion engine 1, the speed n-EM of the electric machine 2, the speed n-GE of the transmission input shaft 11 and the speed n-A of the element of the planetary gear system 5 which, with interposition of the first clutch 6, can be coupled to the internal combustion engine 1, namely in the example embodiment shown, the speed of the ring gear.

Figure 3:
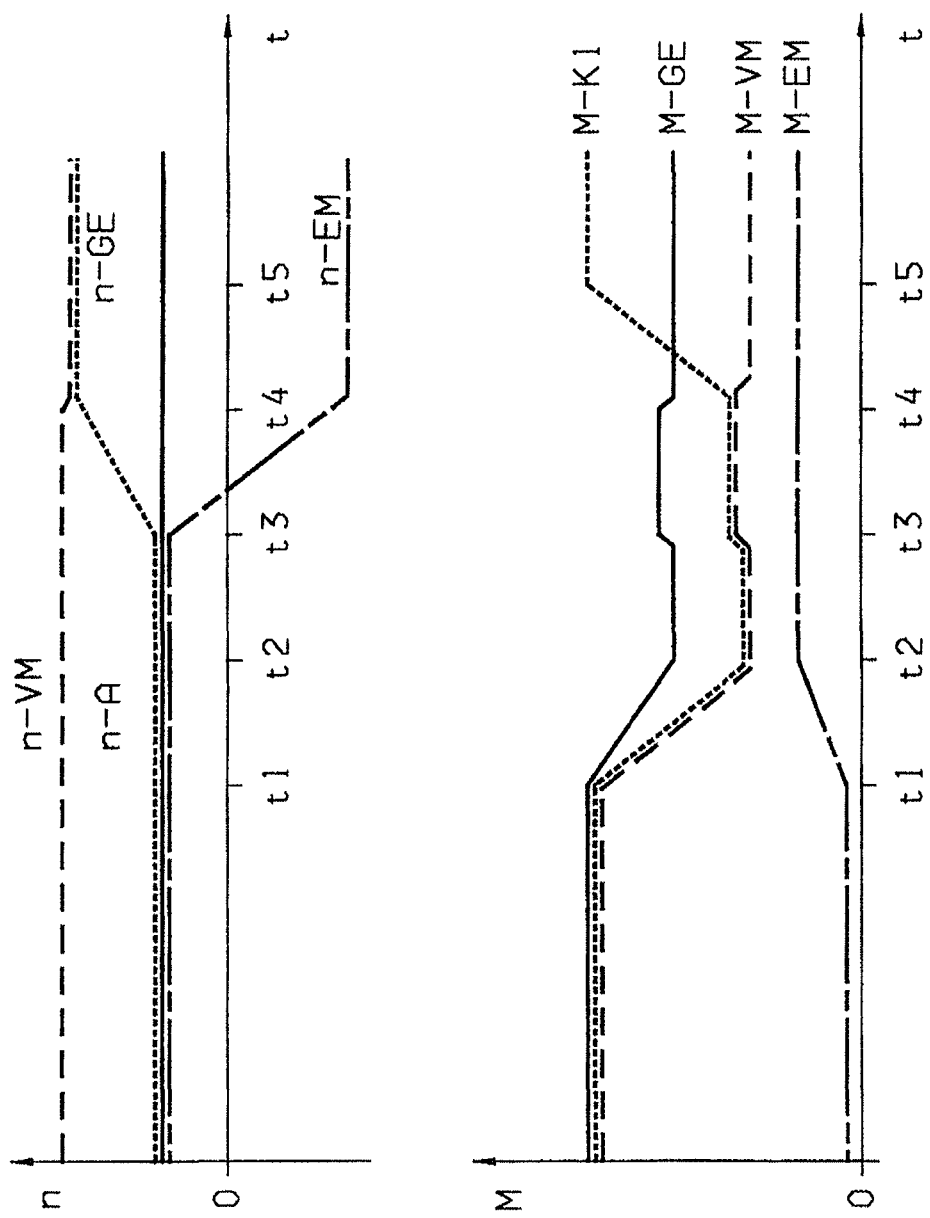
FIG. 3: A second diagram to make clear the method according to the invention for operating a drive-train.

The torque variations shown in FIG. 3 are the torque M-EM delivered by the electric machine 2, the torque M-VM delivered by the internal combustion engine 1, the torque M-GE at the transmission input shaft 11 and the torque M-K1 that can be transmitted by the first clutch 6 of the drive-train.

In the initial condition of the drive-train according to FIG. 3, i.e. before time t1, the clutch 6 or first clutch is operated with slip, so that the clutch 6 transmits the torque M-VM delivered by the internal combustion engine 1 to the drive output 4. The second clutch 7, i.e. the bridging clutch for the planetary gear system 5, is closed, so that in FIG. 3 the internal combustion engine 1 runs at a constant speed n-VM. Here it is assumed that the speed n-VM of the internal combustion engine cannot be reduced any more, i.e. for example it has reached its idling speed. In the example embodiment of FIG. 3 the driving speed is assumed to be constant, as can be seen from the constant level of the speed n-GE of the transmission input shaft 11. In the example embodiment of FIG. 3, the electric machine 2 delivers no torque M-EM in the initial condition, so the torque M-GE at the transmission input shaft 11 is the sum of the torque M-VM from the internal combustion engine 1 and the torque M-EM from the electric machine 2.

Now, to open the second clutch 7 without load in order to change from the ISG to the EDD operating mode, beginning at time t1 and until time t2 the electric machine 2 is operated in relation to the torque M-EM it delivers, in such manner that at time t2 the second clutch 7 is relieved of any load. For this, the ratio of the torque M-EM by the electric machine 2 to the torque M-K1 that can be transmitted by the first clutch is adjusted in accordance with the gear ratio of the planetary gear system 5 so as to satisfy the relation $M\text{-}EM = M\text{-}K1/(-i_0)$, where $i_0$ is the so-termed fixed transmission ratio of the planetary gear system 5. Since the torque M-EM that can be delivered by the electric machine 2 is limited, as shown in the example embodiment of FIG. 3, it is sometimes necessary for the torque M-K1 that can be transmitted by the clutch 6 and the torque M-VM of the internal combustion engine to be reduced at the same time, and then a reduction of the torque M-GE applied at the transmission input shaft 11 has to be accepted.

When the second clutch 7 is free from load at time t2 the second clutch 7 can then be opened under no load, this load-free opening of the clutch 7 taking place between times t2 and t3 in FIG. 3. At time t3 the second clutch 7 is fully open.

In the example embodiment of FIG. 3, between times t3 and t4, on the one hand the torque M-EM delivered by the electric machine 2 and the torque M-K1 that can be transmitted by the first clutch 6, and thus also the torque M-VM delivered by the internal combustion engine 1, are adapted so that the respective speeds change in such manner that the speed difference at the first clutch 6 becomes zero. In the example embodiment shown, this is done by slightly increasing the torque M-K1 that can be transmitted by the clutch 6 and the torque M-VM of the internal combustion engine. During this the speed n-EM of the electric machine 2 also varies, and from time t4 the electric machine 2 operates as a generator.

In the example embodiment of FIG. 3, between times t4 and t5, the first clutch 6 is closed completely, so that the torque M-K1 it can transmit is increased, preferably to the maximum torque that can be transmitted by the first clutch 6, whereby from time t4 wear-free operation of the drive-train in the EDD operating mode takes place. At time t5 the first clutch 6 is fully closed, whereas the second clutch 7 is also fully open.

Accordingly, the invention makes it possible during starting and crawling of a drive-train to change between the EDD and the ISG operating modes while maintaining the traction force, and this in such manner that the bridging clutch 7 is actuated under no load, so that a frictional second clutch 7 can be actuated without wear or alternatively, as shown in FIG. 1, an interlocking bridging clutch 7 can be used.

INDEXES

1 Internal combustion engine
2 Electric machine
3 Transmission
4 Drive output
5 Planetary gear system
6 First clutch
7 Second clutch
8 Carrier
9 Ring gear
10 Sun gear
11 Transmission input shaft
12 Transmission output shaft

The invention claimed is:

1. A method of operating a drive-train, of a hybrid vehicle, comprising a drive aggregate which comprises an internal combustion engine (1), an electric machine (2), a transmission (3), and a planetary gear system (5) comprising a ring gear element (9), a sun gear element (10) and a carrier element (8), a first element of the planetary gear system (5) is fixedly coupled to an input shaft (11) of the transmission (3), a second element of the planetary gear system (5) is fixedly coupled to the electric machine (2), and a third element of the planetary gear system (5) is connectable, via a first clutch (6), to the internal combustion engine (1), and two of the three elements (8, 9, 10) of the planetary gear system (5) are connectable by a second clutch (7) to one another such that, when the second clutch (7) is disengaged, the drive-train operates in a first operating mode and, when the second clutch (7) is engaged, the drive-train operates in a second operating mode, the method comprising the steps of:
changing from the first operating mode to the second operating mode, when the drive-train is either started up or crawling, while maintaining a traction force at a drive output (4) of the drive-train by engaging the second clutch (7) such that a transmission capacity of the first clutch (6) is reduced until the first clutch (6) operates with slip;
operating the internal combustion engine (1) with speed regulation while the second clutch (7) is synchronizing; and
engaging the second clutch (7) without any load.

2. The method according to claim 1, further comprising the step of synchronizing a speed of the electric machine (2) and a speed of the third element of the elements (8, 9, 10) of the planetary gear system (5) during a speed-regulated operation of the internal combustion engine (1).

3. The method according to claim 1, further comprising the step of fully disengaging the first clutch (6) and completely reducing a torque delivered by the internal combustion engine (1) to zero, after engaging the second clutch (7) without any load, for either starting or purely electrical crawling.

4. The method according to claim 1, further comprising the step of increasing the transmission capacity of the first clutch (6) until a desired output torque is reached at the drive output, after engaging the second clutch (7) without any load, for either hybrid starting or crawling.

5. A method of operating a drive-train, of a hybrid vehicle, comprising a drive aggregate which comprises an internal combustion engine (1), an electric machine (2), a transmission (3), and a planetary gear system (5) comprising a ring gear element (9), a sun gear element (10) and a carrier element (8), a first element of the planetary gear system (5) is fixedly coupled to an input shaft (11) of the transmission (3), a second element of the planetary gear system (5) is fixedly coupled to the electric machine (2), and a third element of the planetary gear system (5) is connectable, via a first clutch (6), to the internal combustion engine (1), and two of the three elements (8, 9, 10) of the planetary gear system (5) are connectable by a second clutch (7) such that, when the second clutch (7) is disengaged, the drive-train operates in a first operating mode and, when the second clutch (7) is engaged, the drive-train operates in a second operating mode, the method comprising the steps of:
changing from the second operating mode to the first operating mode, when the drive-train is either started up or crawling, while maintaining a traction force at a drive output (4) of the drive-train by disengaging the second clutch (7) such that a transmission capacity of the first clutch (6) is reduced until the first clutch (6) operates with slip;
adapting torque delivered by the electric machine (2) to eliminate a load at the second clutch (7); and
engaging the second clutch (7) without any load.

6. The method according to claim 5, further comprising the step of adapting at least one of the torque delivered by the electric machine (2), a torque delivered by the internal combustion engine (1) and the transmission capacity of the first clutch (6), after disengaging the second clutch (7) without any load, to reduce a speed difference and the slip of the first clutch (6).

7. The method according to claim 5, further comprising the step of completely engaging the first clutch (6).

8. The method according to claim 5, further comprising the step of defining the first operating mode as an electro-dynamic-drive operating mode and the second operating mode as an integrated-starter-generator operating mode.

9. A method of operating a drive-train of a hybrid vehicle to maintain traction force at a drive output of the drive-train during a change in operation of the drive train, the drive train comprising a drive aggregate comprising an internal combustion engine, an electric machine, a transmission, and a planetary gear system, a carrier (8) of the planetary gear set (5) is continually coupled to an input shaft (11) of the transmission (3) so as to prevent relative rotation between the carrier (8) and the input shaft (11), a sun gear (10) of the planetary gear set (5) is continually coupled to the electric machine (2) so as to prevent relative rotation between the sun gear (10) and the electric machine (2), a ring gear (9) of the planetary gear set (5) is connectable, via a first clutch (6), to the internal combustion engine (1), and the carrier (8) is connectable, via a second clutch (7), to the sun gear (10), and the method comprising the steps of:
initiating a change in operation of the drive train from a first operating mode to a second operating mode when the drive train is either starting up or crawling;
defining the first operating mode as operation of the drive train when the second clutch (7) is disengaged,
defining the second operating mode as operation of the drive train when the second clutch (7) is engaged;

engaging the second clutch (7) to reduce a transmission capacity of the first clutch (6) until the first clutch (6) operates with slip;

regulating a speed of the internal combustion engine (1) while synchronizing the second clutch (7); and fully engaging the second clutch (7) once the second clutch (7) is fully synchronized.

\* \* \* \* \*